Jno. Reily,
Mower.
Nº 14,079. Patented Jan. 8, 1856.

Jno. Reily,
Mower.

Nº 14,079.

Patented Jan. 8, 1856.

Sheet 2. 2 Sheets.

UNITED STATES PATENT OFFICE.

JOHN REILY, OF HART PRAIRIE, WISCONSIN, ASSIGNOR TO HEATH, DOUSMAN & REILY.

IMPROVEMENT IN HARVESTERS.

Specification forming part of Letters Patent No. 14,079, dated January 8, 1856.

*To all whom it may concern:*

Be it known that I, JOHN REILY, of Hart Prairie, in the county of Walworth and State of Wisconsin, have invented certain new and useful Improvements in Reaping and Mowing Machines, of which the following is a full, clear, and exact description of the construction and operation of the same, reference being had to the annexed drawings, making a part of this specification, in which—

Figure 1:
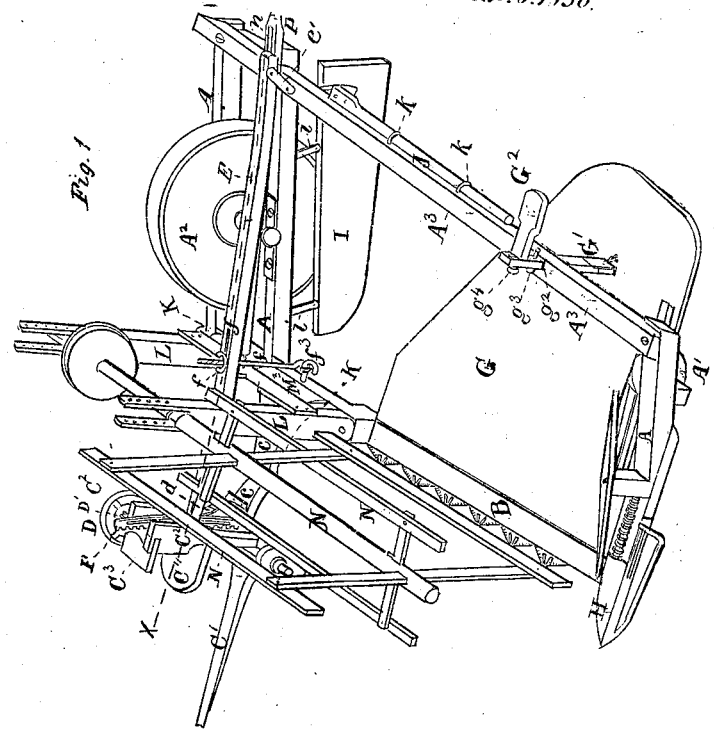
Figure 2:
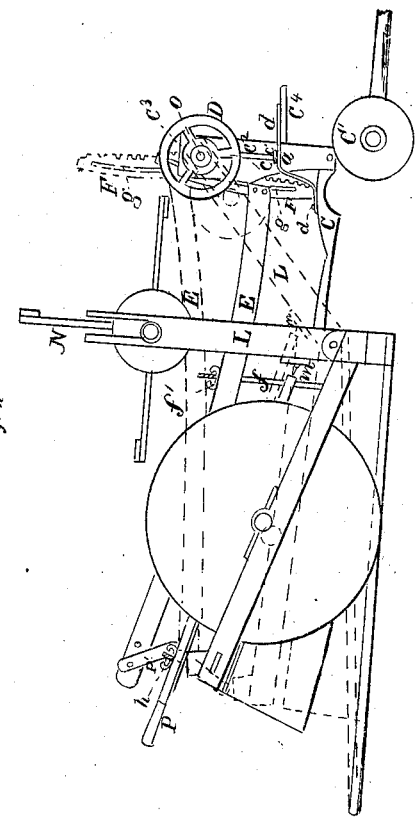
Figure 3:
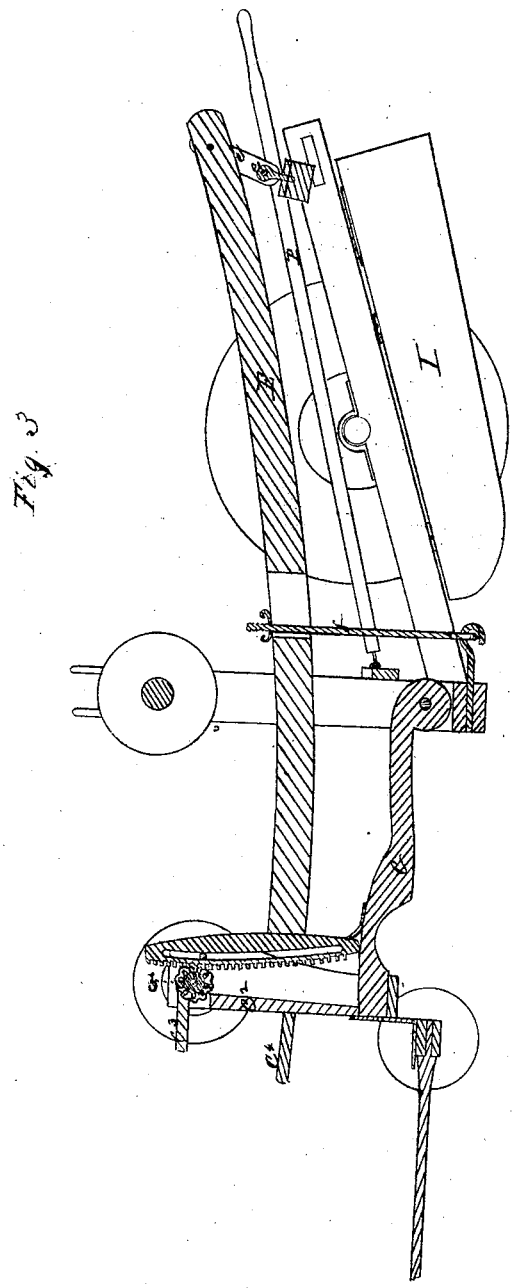

Figure 1 represents a view in perspective of a machine embracing my improvements, showing the grain-guard in position to straighten short grain; Fig. 2, a side elevation of the same, the machine being represented in black lines with the cutter-bar depressed and reel in its upright position, and showing in red lines the cutter-bar raised and reel projected forward; and Fig. 3 represents a vertical longitudinal section through the truck-carriage, raising-lever, cutter-bar, cross-beam of frame, &c., at the line $x$ $x$, Fig. 1.

In reaping and mowing machines it has long been an object of paramount importance so to construct them that their cutters may be raised with expedition and ease to surmount the rocks, stumps, and frequent inequalities of the ground on which they are used, and to lower them again when passed to the position at which they had originally been set. To accomplish this many plans have been essayed with more or less success, but to all of which serious objections exist because of the difficulties with which they are attended. The best and most practical of these is that class which has the lever attached to the tongue of the machine and projecting backward, having a bracket attached to its side, which passes over a standard attached to the inside frame of the machine and convenient to the driver's seat. Through this standard are pierced a series of holes for the reception of a bolt or pin, which passes through them and a hole in the bracket of the lever, so as to confine it at any required position; but while this, as others, accomplishes a useful purpose, it is still fraught with fatal difficulties, as it requires the undivided attention of the driver to make the necessary alterations to raise the cutters to surmount the obstruction—a fact which, if there should happen to be an obstacle of less prominence than the one he is making preparations to override intervening between it and the machine, would of necessity be run into, as it would be overlooked in his preparations, which require considerable time to complete. From this it must be apparent that the machine runs hourly risk of being broken to pieces or otherwise damaged, while the driver himself is kept in constant and imminent peril of his life from his liability to be thrown from his seat by the shock, either in front of the cutters or among the driving gear of the machine. To remedy this defect constitutes the first branch of my invention.

The next branch of my improvements in reaping-machines relates to that class which have swinging platforms, and to which mine more immediately belongs, the advantages of which over others it is unnecessary for me here to allude to.

I am not aware that so far any particular raker's seat has ever been constructed and combined with this class; but it is evident to any one conversant with the construction and use of harvesters that a seat made fast or rigid to the frame of the machine—such as are generally used on other reapers—would not in any way be adapted to this, as the raker would be constantly strained in his attempts to rake off the grain and deliver it properly and evenly on the ground by its rising and falling as it accommodated itself to the undulations and inequalities of the ground, constantly lessening and increasing its distance from him, in this way preventing him from ever acquiring an automatic motion, as it were, in performing his duties, and by which alone the raker is enabled to endure his severe and laborious duties. To provide a seat that would obviate these difficulties constitutes the second branch of my improvements.

Most, if not all, of the inventors of reaping-machines have exerted and tasked their inventive powers so to arrange and combine a raker's seat with their machines that the grain could be delivered upon the ground with regularity and evenness and in a neat and compact bundle, and all with more or less success, but none with certainty. Some of those, believing the attempt to be futile, have struck out a different course and endeavored to accomplish the same end by other means. The most successful of the latter have been those who extended their cutter-beam so as to leave a space between the platform and the frame of a width sufficient to receive the greatest length of grain between them, and attached a guard on or at the under side of the frame to push the grain against, and in this way straighten and deposit it evenly and regularly upon the ground; but while this answered a good purpose when the grain was all of the proper length, it was found that when it was short it had little or no effect, but left it straggling and uneven over the field. To remedy this defect and to furnish a guard which could be readily adjusted by the raker to the varying lengths of grain to be cut without interfering with his other duties constitutes the third and last branch of my improvements.

To enable others skilled in the arts to make, construct, and use my invention, I will proceed to describe it, omitting such parts of the machine as are common and unnecessary for the description and proper understanding of my improvements.

The frame A of my machine is of rectangular form, and is supported and balanced upon the wheel $A'$ and the driving-wheel $A^2$, the wheel $A'$ being capable of adjustment on its bearings, so as to cause the machine to cut at a greater or less distance from the ground. The divider, driving-gear, and cutting apparatus may be of the usual form, or they may embrace my improvements.

On the end of the cutter-bar B, and at the side next the driving-gear, is attached, by means of a hinge-joint, a curved beam, C, projecting forward and resting upon a guide or truck-carriage, $C'$, to which it is attached by a king-bolt. From this beam two standards, $C^2$, rise, on which are secured the driver's seat $C^3$ and pedestal $C^4$.

Immediately in the rear of the driver's seat is supported in suitable bearings in the standards $C^2$ a shaft, $a$, on which are mounted a pinion, $b$, and lever-wheel D. On the inner side of the wheel is cast a disk, $D'$, having a series of notches or indentations in it equal in number to the teeth of the pinion $b$, into which a stop-pin, $c$, is forced by a spring, $d$, to which it is attached, to stop or lock the wheel D and pinion $b$ when required. The spring $d$ is fastened at one end to the curved beam C, while the other projects along the side of the pedestal $C^4$, convenient to the driver's foot, by which it is operated to unlock the wheel D with withdrawing the pin $c$ from the notches in the disk $D'$, the pin being held in its proper position by passing through a small loop or guide-pin, $c'$, made fast to the outside standard, $C^2$.

On the upper side of the rear cross-piece, $A^3$, of the main frame A, and at the end next its inner rail, is mounted a bracket, $e$, on either end of which an arm, $e'$, is jointed or hinged. Between these arms, and at their upper extremity, is loosely bolted the end of a lever, E, which is free to play thereon. At the other extremity of this lever is secured a cogged rack or sector, F, which gears into the pinion $b$, and by which the lever E is raised and lowered for the purpose of raising and lowering the platform, so that the fingers and knife may override any obstruction or be adjusted to cut the grain at various heights. This is accomplished by means of a screw-rod, $f$, passing through a mortise, $f'$, in the lever E, and which is secured on its upper side by means of a thumb-screw, $f^2$, its lower end being hooked to an eye in a screw-bolt, $f^3$, fastened to the inside of the cutter-bar B. The tendency of the lever E, which carries the rack F, being to recede from the pinion as the rear of the machine is depressed, a pin is passed through the standard $C^2$ and a slot, $g$, in the rack to keep it constantly in gear with the pinion, the slot $g$ being made long enough and of the proper curvature to allow the rack to traverse freely over the pinion from one end to the other, as the motion of the lever should direct. The distance from the rear end of the platform to the pinion $b$ when the cutter-bar is depressed is less than when it is raised. For this reason the lever E is provided with the compensating-arms $e'$ to increase its length, as required in raising the cutter-bar.

When the driver desires to raise the front of the machine he presses his foot upon the spring $d$, which detaches the pin $c$ from the notches of the wheel or disk $D'$. This leaves the lever-wheel D free to be rotated by his hand, which, being mounted on the same shaft as the pinion $b$, causes it to revolve and raise the rack F on the end of the lever E. As this lever is raised it carries up with it the rod $f$, attached to the cutter-bar B, in this way raising the front and depressing the rear of the machine.

The rear end of the lever E may be hinged directly to the cross-beam of the frame; but when constructed in this way it will be necessary to set the rack F at an angle to its front extremity sufficient to compensate for the increased distance of the back end of the machine when the cutters are raised from the pinion.

To the inside of the cutter-bar B is hinged in any suitable manner the front end of the platform G, the rear end being attached to and supported by the standard $G'$ by means of a hook and eye or other adjustable attachment. This standard passes freely through a mortise, $g^2$, in the cross-beam $a^3$, in which it plays up and down as the platform rises and falls by the inequalities of the ground or when the dip of the platform is altered. Through this standard are pierced a series of holes for the reception of a pin, $g^3$, passing over the upper side of the beam $A^3$, so as to support and suspend the platform at any required distance from the ground, and at any angle to the cutter-bar, for the greater convenience of raking off the grain. To the upper end and outside of the standard $G'$ is attached a seat, $G^2$, by means of an adjustable screw-bolt, $g^4$, passing through a vertical slot in the standard. The object of this slot is to permit the seat to be raised or lowered to suit the various heights of rakers; or the seat may be raised and lowered to accommodate different-sized rakers, and at the same time attached to the platform by means of a male and female screw, the raker's seat being so arranged and located as to be out of the way of the falling grain, to prevent tangling, and at the same time in the proper position to enable him conveniently to rake the grain off the platform and deposit it evenly and regularly on the ground against the grain-guard.

On the side of the machine next the standing grain, in a line with and immediately in the rear of the divider H, is pivoted to the cutter-bar B by its angled end, in an inclined position toward the platform, a board of rhomboidal shape, having a transversely-curved slot, through which a bolt passes to secure it to a standard on the side frame over the wheel A'. This board causes the grain, when cut and thrown back by the reel, to slide in upon the platform within the power of the raker. It is also used as a track-clearer when the platform is removed for mowing, it being depressed for that purpose by means of the slot and pivot.

On the under side of the inner rail that supports the driving-wheel is attached an adjustable grain-guard, I, by means of two arms, $i$, so placed as to project it toward the platform G in a line parallel with the frame, in the same manner as the arms of a parallel ruler. This operation is performed by a lever attached to its upper side and rear extremity by means of a plate, $j$, set at the proper angle, and having a slot through which a bolt in the guard I plays, the end J, by which the lever is operated, being brought within convenient reach of the raker, and working parallelly with and through brackets $k$ in the cross-piece of the frame. The adjustability of this guard is for the purpose of enabling the raker to straighten the grain with facility and ease as it is brought in contact with it in depositing it upon the ground, whether the grain be long or short, for it must be evident that when the guard is in its withdrawn position the short grain would fail to reach it and it be unable to perform its proper functions, while by adjusting it to the proper distance it will do its work well.

On the front ends of the rails of the frame that support the driving-gear, and in close proximity to the cutter-bar, are raised two standards, K, to which are hinged the reel-posts L by a cross-bar, $M^3$, on which they are secured. In the upper extremity of these posts the reel N is mounted in suitable bearings, capable of adjustment by means of screws to raise and lower it to suit the different heights of grain to be cut. To still further increase this adjustability, the posts themselves are hinged to the frame, that they may either be projected forward or backward for the same purpose. This latter adjustment is effected through the agency of a lever made fast to the cross-bar $M^3$ by a hook and eyebolt, $m$, or in any other suitable manner, and extending back over and through a groove in the cross-beam $A^3$, to which it is secured by means of a bolt, $n$, passing through a longitudinal slot, $n'$, to permit its being worked back and forth as required by the raker; or it may be accomplished by means of a lever attached to the front of the cross-bar $M^3$, and projecting upward and forward to the driver's seat, to be operated by him when required.

From the foregoing description it is apparent that my improvements are susceptible of many modifications without in the least altering the principle of my invention.

Having thus fully described my invention, what I claim as new, and desire to secure by Letters Patent, is—

1. The method of raising and lowering the cutter-bar, substantially as described.

2. The arrangement and combination of a raker's seat with a swinging platform, as described.

3. The adjustable grain-guard or straightening-board I, for the purposes described.

In testimony whereof I hereunto subscribe my name.

JOHN REILY.

Witnesses:
  JNO. JOHNSON,
  P. HANNAY.